(12) United States Patent
Kobayashi

(10) Patent No.: US 7,692,894 B2
(45) Date of Patent: Apr. 6, 2010

(54) THIN FILM MAGNETIC HEAD THAT HAS SOLENOID TYPE RECORDING COIL

(75) Inventor: Kiyoshi Kobayashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 540 days.

(21) Appl. No.: 11/564,754

(22) Filed: Nov. 29, 2006

(65) Prior Publication Data

US 2007/0121247 A1    May 31, 2007

(30) Foreign Application Priority Data

Nov. 30, 2005  (JP) .............................. 2005-345730

(51) Int. Cl.
*G11B 5/17*  (2006.01)
(52) U.S. Cl. ........................... 360/123.09; 360/123.05; 360/123.06; 360/123.46
(58) Field of Classification Search ............ 360/123.05, 360/123.06, 123.09, 123.1, 123.38, 123.46
See application file for complete search history.

(56) References Cited

U.S. PATENT DOCUMENTS

| | | | | |
|---|---|---|---|---|
| 4,985,985 | A * | 1/1991 | Das .......................... | 29/603.14 |
| 6,501,619 | B1 * | 12/2002 | Sherrer et al. .......... | 360/125.03 |
| 7,443,632 | B1 * | 10/2008 | Stoev et al. ............. | 360/123.05 |
| 7,495,864 | B2 * | 2/2009 | Kobayashi ............... | 360/123.1 |
| 2002/0089783 | A1 * | 7/2002 | Matono ..................... | 360/126 |
| 2006/0132972 | A1 * | 6/2006 | Tagami et al. ............. | 360/126 |

FOREIGN PATENT DOCUMENTS

| | | |
|---|---|---|
| JP | 8-7222 | 1/1996 |
| JP | 2002-170205 | 6/2002 |
| JP | 2003-303405 | 10/2003 |
| JP | 2004-158176 | 6/2004 |
| JP | 2004-362668 | 12/2004 |
| JP | 2005-285228 | 10/2005 |

OTHER PUBLICATIONS

Office Action issued in corresponding Japanese Patent Application No. 2005-345730; issued Sep. 30, 2008.

* cited by examiner

*Primary Examiner*—Jefferson Evans
(74) *Attorney, Agent, or Firm*—Brinks Hofer Gilson & Lione

(57) ABSTRACT

A thin film magnetic head is provided. The thin film magnetic head includes an upper coil wire group and a lower coil wire group. Two columns of coil contact groups that are formed on both end portions of individual coil wires of the upper coil wire group and the lower coil wire group, connect both end portions of the coil wires. An insulating resist layer buries a space between coil contacts of the coil contact groups. An inorganic insulating layer buries a space between the two columns of coil contact groups. The upper coil wire group, the lower coil wire group, and the two columns of coil contact groups form a thin film coil that applies a magnetic recording field to the magnetic material layer. The insulating resist layer and the inorganic insulating layer are located at the same lamination height as the two columns of coil contact groups.

4 Claims, 2 Drawing Sheets

THIN FILM MAGNETIC HEAD THAT HAS SOLENOID TYPE RECORDING COIL

This application claims the benefit of Japanese Patent Application No. 2005-345730 filed Nov. 30, 2005, which is hereby incorporated by reference.

BACKGROUND

1. Field

The present embodiments relate to a thin film magnetic head that has a solenoid type recording coil.

2. Related Art

Generally, a recording element portion of a thin film magnetic head includes a magnetic material layer that is formed of a magnetic material. A thin film coil induces a recording magnetic field to the magnetic material layer. A magnetic gap layer is formed at a front end of the magnetic material layer. Magnetic information is recorded on a recording medium by a leakage magnetic field from the magnetic material layer through the magnetic gap layer at a surface that faces the recording medium.

Recently, a solenoid type thin film coil that is wound around a magnetic material layer as a core such that a three-dimensional space around the magnetic material layer is efficiently used has been developed, thereby reducing the size of a recording element portion. The solenoid type thin film coil includes a lower coil wire group that has a plurality of coil wires formed below the magnetic material layer, an upper coil wire group that has a plurality of coil wires formed above the magnetic material layer, and a coil contact layer that electrically connects end portions of individual coil wires of the lower coil wire group and the upper coil wire group. The solenoid type thin film coil may be exemplarily formed according to the following process.

First, a lower coil wire group is formed by arranging a plurality of coil wires formed of, for example, Cu, to extend in a track width direction below the magnetic material layer in a height direction. A coil insulating layer is formed to bury the lower coil wire group and their pitches. A part of the coil insulating layer is removed so as to expose both end portions of the individual coil wires of the lower coil wire group, and a coil contact layer group is formed on both end portions. At the same time, an auxiliary yoke layer is formed so as to be magnetically connected to the magnetic material layer.

Each space between the coil contact layers of the coil contact layer group and each space between each coil contact layer and the auxiliary yoke layer are buried with an insulating resist, and an alumina is formed on the insulating resist so as to planarize an upper surface of the auxiliary yoke layer. A magnetic material layer is formed on the auxiliary yoke layer, and the upper coil wire group is formed on the magnetic material layer through a coil insulating base layer. Both end portions of the individual coil wires of the upper coil wire group are connected to the lower coil wire group through the coil contact layer.

JP-A-8-7222 is an example of the related art.

However, in the known solenoid type thin film coil, since the space between the coil contact layers and the space between each coil contact layer group and the auxiliary yoke layer are buried with an insulating resist layer and alumina is formed on the insulating resist layer, if the thin film coil generates heat, the insulating resist expands, which causes the recording element portion to protrude toward the surface that faces the recording medium.

In the related art, if the recording element portion protrudes toward the surface that faces the recording medium, the protruding portion may damage the recording medium or the recording element portion itself may be damaged. Also in the related art, if the upper surface of the auxiliary yoke layer is planarized by a CMP processing, resist smear may occur. In order to avoid the resist smear, alumina may be used to bury the space between the coil contact layers. Since the coil contact portion has a narrow pitch gap with respect to its thickness (an aspect ratio is small), it is difficult to completely bury the space between the coil contact layers with alumina, and pores may occur.

SUMMARY

The present embodiment may obviate one or more of the drawbacks inherent in the related art. For example, in one embodiment, a thin film magnetic head has insulation between coil contacts and can control protrusion of a recording element portion due to coil heat.

Generally, if insulating resist is used to bury only a space between coil contacts, the space between the coil contacts is reliably buried and an insulating resist region becomes small. Therefore, the amount of heat expansion of the insulating resist is suppressed, and thus it is possible to control the protrusion of the recording element portion. When a CMP processing is performed on the surface of an auxiliary yoke layer, it is also possible to reduce smear during the CMP processing.

In one embodiment, a thin film magnetic head includes an upper coil wire group and a lower coil wire group that are respectively located above and below a magnetic material layer and respectively have a plurality of coil wires arranged in a height direction to extend in a track width direction. Two columns of coil contact groups are formed on both end portions of individual coil wires of the upper coil wire group and the lower coil wire group and connect both end portions of the coil wires. An insulating resist layer buries a space between coil contact layers of the coil contact groups, and an inorganic insulating layer that buries a space between the two columns of coil contact groups. The upper coil wire group, the lower coil wire group, and the two columns of coil contact groups form a thin film coil that applies a recording magnetic field to the magnetic material layer. The insulating resist layer and the inorganic insulating layer are disposed at the same lamination height as the two columns of coil contact groups.

In one embodiment, a thin film magnetic head includes an upper coil wire group and a lower coil wire group that are respectively located above and below a magnetic material layer and that respectively have a plurality of long coil wires arranged in a height direction to extend in a track width direction. Two columns of coil contact groups are formed on both end portions of individual coil wires of the upper coil wire group and the lower coil wire group and connect both end portions of the coil wires. An auxiliary yoke layer is formed at the same lamination height as the coil contact groups and is magnetically connected to the magnetic material layer. An insulating resist layer buries a space between coil contact layers of the coil contact groups while being out of contact with the auxiliary yoke layer. An inorganic insulating layer buries a space between the coil contact groups and the auxiliary yoke layer.

The upper coil wire group, the lower coil wire group, and the two columns of coil contact groups form a thin film coil that applies a recording magnetic field to the magnetic material layer. The insulating resist layer and the inorganic insulating layer are disposed at the same lamination height as the two columns of coil contact groups.

In one embodiment, the inorganic insulating layer is formed of, for example, $Al_2O_3$, $SiO_2$, or Al—Si—O.

In one embodiment, since the insulating resist is formed only on a space between the coil contact layers and the inorganic insulating layer covers regions other than the space between the coil contact layers, it is possible to provide a thin film magnetic head that can ensure insulation between coil contacts and can control protrusion of a recording element portion due to coil heat.

DETAILED DESCRIPTION

Figure 1:
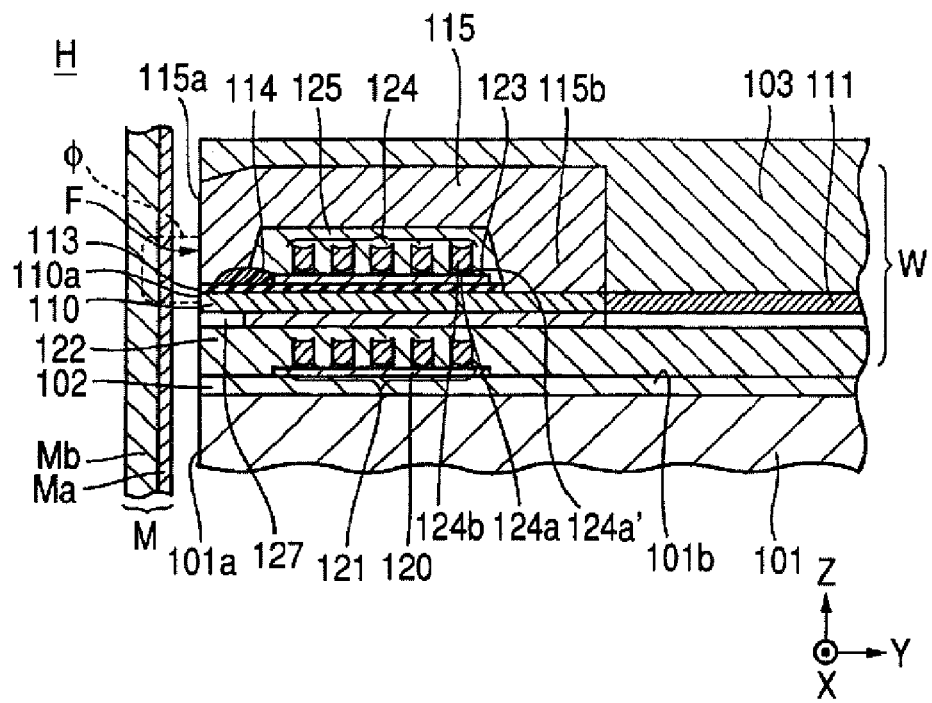
FIG. 1 is a partial longitudinal cross-sectional view of one embodiment of a laminate structure of a thin film magnetic head.

Exemplary embodiments will now be described with reference to the drawings. In the drawings, an X direction is defined as a track width direction, a Y direction is defined as a height direction, and a Z direction is defined as a lamination direction of individual layers that forms a thin film magnetic head.

FIG. 1 is a partial longitudinal cross-sectional view that shows a laminate structure of a thin film magnetic head. A thin film magnetic head H is a vertical magnetic head that applies a vertical magnetic field Φ to a recording medium M and magnetizes a hard film Ma of the recording medium M in a vertical direction so as to perform a recording operation. The recording medium M includes the hard film Ma that has high residual magnetization and is provided on a surface of the recording medium M, and a soft film Mb that has high magnetic transmittance and is provided inside the hard film Ma. The recording medium M has, for example, a disc shape and rotates with a center of the disk as a center of a rotation axis.

In one embodiment, the thin film magnetic head H includes, on an trailing end surface 101b of a slider 101, a nonmagnetic insulating layer 102, a recording element portion W, and a surface protective layer 103 that covers the recording element portion W. The slider 101 is formed of a nonmagnetic material, for example, $Al_2O_3$.TiC. A medium-opposing surface 101a of the slider 101 faces the recording medium M. In this embodiment, if the recording medium M rotates, the slider 101 floats from the surface of the recording medium M by airflow. Alternatively, the slider 101 slides on the recording medium M. The nonmagnetic insulating layer 102 and the surface protective layer 103 are formed of an inorganic material, for example, $Al_2O_3$ or $SiO_2$.

The recording element portion W includes a main magnetic layer 110, an auxiliary magnetic layer 115, and a magnetic gap layer 113 that is interposed between the main magnetic layer 110 and the auxiliary magnetic layer 115 at an opposing surface F to the recording medium M, a recording coil C that applies a recording magnetic field to the main magnetic layer 110 and the auxiliary magnetic layer 115, and an auxiliary yoke layer 117 that is magnetically connected to the main magnetic layer 110.

In one embodiment, the main magnetic layer 110 is formed of a ferromagnetic material that has a high saturated magnetic flux density, for example, Ni—Fe, Co—Fe, or Ni—Fe—Co. The main magnetic layer 110 has a predetermined length in the Y direction (height direction) in the drawing from the opposing surface F. In addition, a length in the X direction (track width direction) of a front end surface 110a exposed toward the opposing surface F is defined as a track width. The auxiliary yoke layer 117 is formed of a magnetic material that has a lower saturated magnetic flux density than that of the main magnetic layer 110 and is formed immediately below the main magnetic layer 110.

The auxiliary yoke layer 117 magnetically functions as a part of the main magnetic layer 110. An insulating material layer 111 and an inorganic insulating layer 127 are formed of, for example, $Al_2O_3$, $SiO_2$, or Al—Si—O and are formed around the main magnetic layer 110 and the auxiliary yoke layer 117.

The magnetic gap layer 113 that is formed of a nonmagnetic material, for example, alumina, $SiO_2$, Au, or Ru is provided on the main magnetic layer 110 and the insulating material layer 111. The auxiliary magnetic layer 115 is formed of a ferromagnetic material that has a high saturated magnetic flux density, for example, Ni—Fe, Co—Fe, or Ni—Fe—Co. A front end surface 115a of the auxiliary magnetic layer 115 exposed toward the opposing surface F is formed to face the main magnetic layer 110 to be space by a gap interval G. The auxiliary magnetic layer 115 is connected to the main magnetic layer 110 by a connection portion 115b located at the inner side than the opposing surface 115a in the height direction.

A height determining layer 114 is formed on the magnetic gap layer 113 at a position spaced by a predetermined distance from the opposing surface F. The height determining layer 114 is formed of an inorganic or organic material. A slot height of the thin film magnetic head H is defined by the distance from the opposing surface F to a front edge of the height determining layer 114.

A recording coil includes a lower coil wire group 121 that is formed on the nonmagnetic insulating layer 102 through a coil insulating base layer 120, an upper coil wire group 124 that is formed on the magnetic gap layer 113 through a coil insulating base layer 123, and coil contact groups 126 (see FIGS. 2 and 3) that connect the lower coil wire group 121 and the upper coil wire group 124.

The lower coil wire group 121 and the upper coil wire group 124 are respectively formed by arranging a plurality of coil wires in the height direction to extend in the recording track width direction. End portions of the individual coil wires are connected to each other by the coil contact groups 126 so as to be wound around the main magnetic layer 110 and the auxiliary yoke layer 117 as a core, such that a solenoid coil is formed. Each of the coil wires of the lower coil wire group 121 and the upper coil wire group 124 is formed by one or more nonmagnetic metal materials selected from a group of, for example, Au, Cu, Ni, or Al.

The lower coil wire group 121 and the upper coil wire group 124 are respectively covered with coil insulating layers 122 and 125 formed of an organic insulating material, such as resist. An upper surface of each of the coil insulating layers 122 and 125 is planarized, and the auxiliary yoke layer 117 and the auxiliary magnetic layer 115 are respectively formed on the planarized surface.

Figure 2:
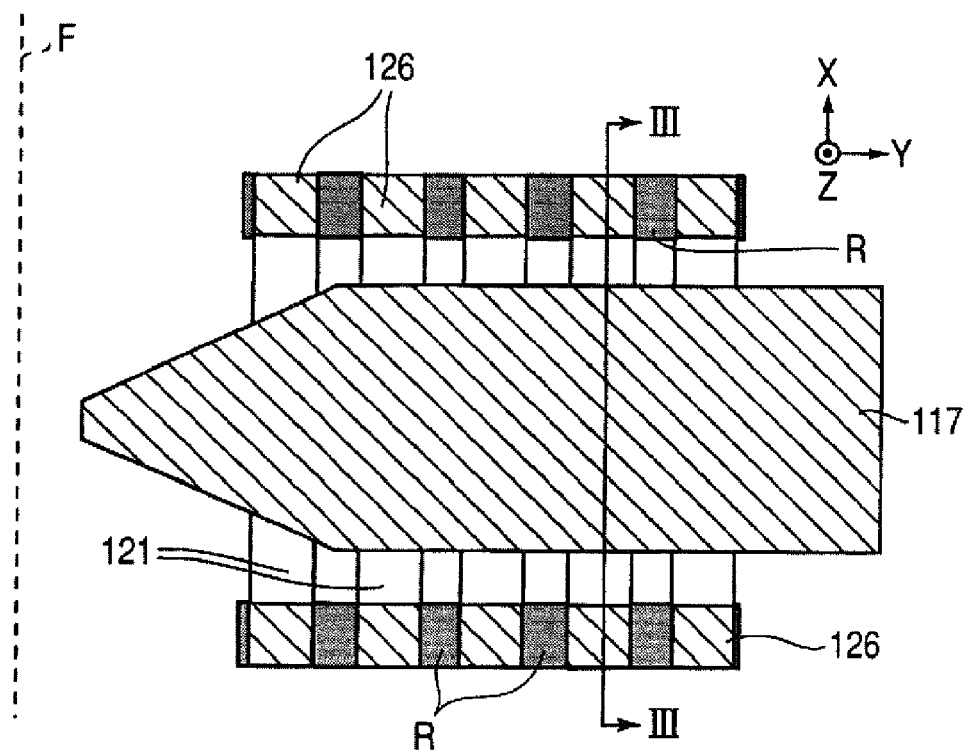
FIG. 2 is a partial plan view of one embodiment of a coil contact group.
Figure 3:
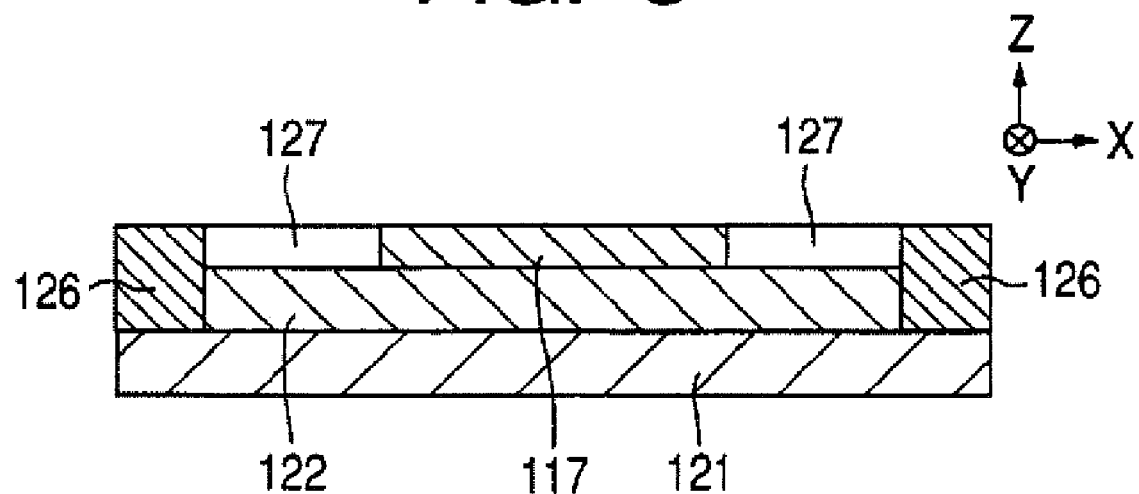
FIG. 3 is a partial transverse cross-sectional view of one embodiment of a coil contact group.

FIG. 2 is a schematic plan view that shows a coil contact group and FIG. 3 is a schematic cross-sectional view that shows a coil contact group. As shown in FIGS. 2 and 3, the coil contact groups 126 are formed on both end portions of individual coil wires of the lower coil wire group 121 in the track width direction. The coil contact groups 126 are placed at both end portions of the coil wires to have the same pitch interval as the coil pitch interval in the height direction. Two columns of coil contact groups 126 have the same lamination height as the auxiliary yoke layer 117 formed on the coil insulating layer 122 that covers the lower coil wire group 121.

In each of the coil contact groups 126, a space between the coil contacts is completely buried with an insulating resist R. The insulating resist R is coated on only the space between the coil contacts of the coil contact group 126 at the same lamination height as the coil contact groups 126 and the auxiliary yoke layer 117. For example, the insulating resist R does not exist in regions other than the coil contact groups 126 and are out of contact with the auxiliary yoke layer 117. The space between the auxiliary yoke layer 117 and the coil contact groups 126 is buried with an inorganic insulating layer 127 for planarizing the upper surface of the auxiliary yoke layer 117.

The inorganic insulating layer 127 is formed of an inorganic material, for example, $Al_2O_3$, $SiO_2$, or Al—Si—O. The inorganic insulating layer 127 has a smaller thermal expansion coefficient than that of the insulating resist R, it does not undergo thermal expansion, unlike the insulating resist R. After the auxiliary yoke layer 117 and the coil contact groups 126 are formed, the inorganic insulating layer 127 is entirely formed by coating the insulating resist R only on the space between the coil contacts, and subsequently a CMP processing is performed.

In one embodiment, if the insulating resist R is used to bury only the space between the coil contacts of the coil contact groups 126 (i.e. as described above), even though the pitch interval of the coil contact group 126 (pitch interval between the lower coil wire group 121 and the upper coil wire group 124) is smaller than the thickness of the coil contact, it is possible to completely bury the space between the coil contacts and it is also possible to ensure insulation between the coil contacts.

In this embodiment, since the insulating resist R is partially coated, even though the recording coil (the lower coil wire group 121 and the upper coil wire group 124) generates heat, the thermal expansion of the insulation resist R due to heat is small, such that it is possible to prevent excessive protrusion of the recording element portion W toward the recording medium. In one embodiment, if the insulating resist R is partially coated, it is possible to reduce resist smear during the CMP processing for planarizing the upper surface of the auxiliary yoke layer 117.

In this embodiment, the coil contact groups 126 that connect the lower coil wire group 121 and the upper coil wire group 124 are formed at the same lamination height as the auxiliary yoke layer 117. The coil contact groups 126 may be formed at a lamination height different from that of the auxiliary yoke layer 117. When the coil contact groups 126 are formed at a lamination height different from that of the auxiliary yoke layer 117, that is, when the auxiliary yoke layer 117 is not formed between the two columns of coil contact groups 126, the space between the two columns of coil contact groups 126 is preferably buried with an inorganic insulating layer.

In the above description, the embodiment in which the present embodiments are applied to a vertical magnetic recording head has been described, but the present embodiments can be applied to a longitudinal recording type thin film magnetic head.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A thin film magnetic head comprising:
   an upper coil wire group and a lower coil wire group that are respectively located above and below a magnetic material layer and that respectively have a plurality of coil wires arranged in a height direction to extend in a track width direction;
   two columns of coil contact groups that are formed on both end portions of individual coil wires of the upper coil wire group and the lower coil wire group and connect both end portions of the coil wires;
   an insulating resist layer that buries a space between coil contacts of the coil contact groups; and
   an inorganic insulating layer that buries a space between the two columns of coil contact groups,
   wherein the upper coil wire group, the lower coil wire group, and the two columns of coil contact groups form a thin film coil that applies a magnetic recording field to the magnetic material layer, and
   the insulating resist layer and the inorganic insulating layer are located in at least a cross section of the two columns between coil contact groups that is perpendicular to the lamination direction.

2. The thin film magnetic head according to claim 1, wherein the inorganic insulating layer is formed of $Al_2O_3$, $SiO_2$, or Al—Si—O.

3. A thin film magnetic head comprising:
   an upper coil wire group and a lower coil wire group that are respectively located above and below a magnetic material layer and that respectively have a plurality of long coil wires arranged in a height direction to extend in a track width direction;
   two columns of coil contact groups that are formed on both end portions of individual coil wires of the upper coil wire group and the lower coil wire group and connect both end portions of the coil wires;
   an auxiliary yoke layer that is formed at the same lamination height as the coil contact groups and is magnetically connected to the magnetic material layer;
   an insulating resist layer that buries a space between coil contact layers of the coil contact groups while being out of contact with the auxiliary yoke layer; and
   an inorganic insulating layer that buries a space between the coil contact groups and the auxiliary yoke layer,
   wherein the upper coil wire group, the lower coil wire group, and the two columns of coil contact groups form a thin film coil that applies a recording magnetic field to the magnetic material layer, and
   the insulating resist layer and the inorganic insulating layer are disposed in at least a cross section of the two columns between coil contact groups that is perpendicular to the lamination direction.

4. The thin film magnetic head according to claim 3, wherein the inorganic insulating layer is formed of $Al_2O_3$, $SiO_2$, or Al—Si—O.

* * * * *